United States Patent Office 3,375,303
Patented Mar. 26, 1968

3,375,303
ETHYLENE POLYMER COMPOSITION PROVIDING GOOD CONTOUR SURFACE AT VERY HIGH EXTRUSION RATES
William H. Joyce, Somerset, N.J., assignor to Union Carbide Corporation, a corporation of New York
No Drawing. Continuation-in-part of application Ser. No. 225,859, Sept. 24, 1962. This application Oct. 7, 1964, Ser. No. 402,318
4 Claims. (Cl. 260—897)

ABSTRACT OF THE DISCLOSURE

High speed extrudability of low density polyethylene is improved by addition of a minor quantity of high density, high molecular weight polyethylene having a density of at least 0.930, a melt index of not more than 0.1 decigram per minute and a melt flow of not more than 10 decigrams per minute.

---

This application is a continuation-in-part of my application Ser. No. 225,859, filed Sept. 24, 1962 and now abandoned.

This invention relates to thermoplastic compositions useful in wire insulation. More particularly, the invention relates to thermoplastic polyethylene compositions which are extrudable into wire insulation at very high speeds without sacrifice of surface smoothness.

The search for suitable wire insulating compositions has resulted in the evaluation of numerous synthetic organic polymers. Satisfactory materials for this application must have good dielectric properties and an attractive surface appearance. Polyethylene polymer, both low and high density, and polypropylene have low dielectric losses and have been considered to be leading candidates for wire insulation. Polypropylene, however, is deficient in low temperature toughness, with some forms having a brittle temperature of +6° C. Moreover, polypropylene is prone to oxidize and to degrade upon exposure to the atmosphere if in contact with copper. Unfortunately, the additives presently used to control oxidation and degradation of polypropylene, if used in effective amounts increase dielectric losses to unacceptable levels.

Polyethylene is an ideal wire insulation. Although high density polyethylene is generally too difficultly extrudable to be an optimum wire insulation, low density polyethylene extrudes easily and well. The only limitation encountered in the use of low density polyethylene is its lack of amenability to very high speed extrusion wire coating. Speeds of 2000 to 3000 feet per minute (f.p.m.) are now not uncommon in wire coating. High speed extrusion rates are desirable from the standpoint of operating efficiency and, moreover, are a necessity in order to keep up with the demand for insulated wire without increasing costs to an uneconomical level. High speed extrusion rates with low density polyethylene causes extrusion melt fracture and results in extruded profiles having impaired surface characteristics. Surface roughness, typified by crested and peaked waviness easily perceived by touch or sight, renders wire low density polyethylene insulation unattractive and unsaleable.

It has been proposed to incorporate polypropylene in polyethylene to improve the latter's high speed extrusion performance, but this approach only adds the many, still unsolved, problems of polypropylene insulation mentioned above to the comparatively few problems of polyethylene.

In addition, polypropylene differs widely from polyethylene in softening temperature (by ca. 65° C.) and this complicates the achieving of adequate compounding for good pigment dispersion which is important in color-coded wires such as telephone signals.

The chemical dissimilarity between polyethylene and polypropylene prevents blending the two to a homogeneity which would enable resistance to microseparations upon tensile stress or bending flexure. This microseparation is evidenced by a whitening of the stressed, flexed insulation.

It is an object, therefore, of the present invention to provide a thermoplastic polyethylene wire insulation composition endowed with the electrical and physical property benefits of low density polyethylene wire insulation, but which is extrudable at very high rates into smooth surfaced wire insulation.

It has now been discovered in accordance with this invention that this and other objects are achieved by incorporating in a low density polyethylene extrusion composition a minor amount of a high density, high molecular weight polyethylene having a density of at least 0.930, a melt index of not more than 0.1 decigram per minute and a melt flow of not more than 10 decigrams per minute.

Because of the close chemical similarity between high and low density polyethylene, compounding a mixture of the two to homogeneity is not a problem and as a result remarkable uniformities of electrical and physical properties at high levels are realized with this invention.

High density, high molecular weight, polyethylene used in this invention has been known for some time but only as a laboratory curiosity. Because of its high molecular weight, this polyethylene cannot be fabricated into useful articles by conventional thermoplastic forming techniques such as injection molding, blow molding, slot extrusion, die extrusion and the like. In fact, this polyethylene has not been successfully extrusion coated onto wire by any known procedure, including very slow wire coating extrusion techniques. This polyethylene can only be formed into test specimens by drastic forming techniques such as sintering and high pressure compression molding.

For all practical purposes then, the high density, high molecular weight polyethylene used in this invention is an intractable, unprocessable polymer. For this reason, it was quite surprising to discover that a high density, high molecular weight polyethylene, which itself is not extrudable, improves the extrusion characteristics of readily extrudable low density polyethylene. Moreover, because the high density polyethylene is one of narrow molecular weight distribtuion, it is prone to melt fracture but in this invention, melt fracture is greatly improved. In other words, the low and high density polyethylene constituents of the composition of this invention produce a synergistic effect, that is, the composition exhibits a property possessed by neither constituent alone.

The high density, high molecular weight polyethylene used in this invention has a density of at least 0.930, preferably with the range of from about 0.935 to about 0.965, and a molecular weight sufficient to have a melt index (measured at 44 p.s.i. and 190° C. according to ASTM D-1238-57T) of not more than 0.1 decigram per minute, preferably not more than 0.05 decigram per minute, and a melt flow (measured at 440 p.s.i. and 190° C. according to ASTM D-1238-57T) of not more than 10 decigrams per minute, preferably not more than 5 decigrams per minute. Higher density polyethylene, e.g., 0.98 or higher, with these melt index and melt flow characteristics can be used if desired. In order to insure accurate density measurements the ash content of the high density polyethylene should be not more than 0.2% by weight.

The molecular weight of high density polyethylene used herein is also characterized by intrinsic viscosity (IV). Suitable high density polyethylene has a molecular weight sufficient to have an intrinsic viscosity of at least about 2.4, preferably at least about 2.8 measured in tetraline at 125° C. according to the procedure of ASTM D-1601-61. The manner in which intrinsic viscosity is calculated is discussed in detail below in connection with Table I.

High density, high molecular weight polyethylene described herein can be employed in amounts of up to 40% by weight, based on the weight of the composition. However, for purposes of the present invention, it is preferred to use from about 1 to about 9 percent by weight, and even more preferred to use from about 3 to about 7 percent by weight of high density, high molecular weight polyethylene. Amounts of 9 percent and less are preferred because they provide a composition which has essentially the same physical properties as low density polyethylene, which are best for wire insulation, but which can be extruded at very high rates into smooth surfaced wire insulation. Amounts in excess of 9 percent and up to 40 percent by weight, while they can be employed, are not particularly desirable from the standpoint of cost and because such compositions require more vigorous conditions to perform properly at high extrusion rates. Also, the degree of improvement is not significantly greater than with amounts of from 1 to 9 percent. Amounts in excess of 40% are not suitable because the properties of the high density polyethylene dominate.

Suitable high density polyethylene used herein can be prepared in particle form by polymerizing ethylene in the presence of a nonsolvating diluent, such as pentane, at a temperature below about 100° C. with a Phillips olefin polymerization catalyst which consists essentially of chromium oxide and at least one of silica, alumina, zirconia, and thoria, at least part of the chromium being in the hexavalent state at the initial contacting of the ethylene therewith.

A catalyst for producing high density polyethylene useful in the present invention is described in U.S. Patent 2,825,721 to J. P. Hogan et al., which is incorporated herein by reference.

The high density polyethylene whose preparation is referred to above is known as particle form polyethylene since it is formed as discrete droplets suspended in a reaction diluent. While high density polyethylenes having the characteristics described herein produced by other known polymerization processes can be used, particle form polyethylene is preferred in this invention because of the ease with which it can be produced and its commercial availability.

For purposes of demonstrating the unique properties of the high density, high molecular weight polyethylene used in the present invention, a comparison in properties is made in Table I below among three commercially available high density polyethylenes. These polymers are (A) particle form polyethylene sold by Phillips Petroleum Company under the designation 03-2-0069, (B) solution form (so called because it dissolves in the reaction solvent) polyethylene sold by Union Carbide Corporation under the designation DGD-5770, and (C) Ziegler type polyethylene sold by Union Carbide Corporation under the designation DMD-3009.

As can readily be seen from Table I, high density, high molecular weight polyethylene used in this invention, exemplified by polyethylene (A) in Table I, exhibit properties quite distinct from conventional high density polyethylenes. The high molecular weight of these polymers, indicated by the melt index, melt flow and intrinsic viscosity values, renders them unprocessable for all practical purposes whereas other conventional high density polyethylenes can be formed and molded using conventional thermoplastic fabricating techniques. It was quite surprising then to discover that high density, high molecular weight, unprocessable polyethylene when incorporated with low density polyethylene according to this invention actually improves the processability of the latter.

Preferred low density polyethylene in the instant compositions range in density from about 0.915 to about 0.925 and more preferably from about 0.918 to about 0.922.

The high density, high molecular weight polyethylene can be incorporated in the low density polyethylene by any of the techniques known and used in the art to blend and compound thermoplastics to homogeneous masses. Among other techniques are fluxing in a variety of apparatus including multi-roll mills, screw mills, compounding extruders and Banbury mixers, dissolving in mutual or compatible solvents and like or equivalent methods.

The composition of the present invention can contain in the usual amounts, conventional additives, e.g. fillers, extenders, opacifiers, modifiers and stabilizers.

The following examples are intended to further illustrate the present invention without limiting the same in any manner. All parts and percentages are by weight unless indicated otherwise.

The following ASTM procedures were used to obtain data in the examples:

| | |
|---|---|
| Density | ASTM D-792-50 |
| Melt flow | ASTM D-1238-57T |
| Melt index | ASTM D-1238-57T |
| Tensile strength and percent elongation | ASTM D-638-58T |

Melt fracture determinations were made by a panel of three persons comparing wire samples with extruded insulation thereon. Each sample was graded as follows:

1 = no melt fracture
2 = slight melt fracture
3 = extensive melt fracture
4 = extreme melt fracture The average of the three grades for each sample was reported as the melt fracture rating.

In the examples and controls, compositions were prepared by fluxing the components in a Banbury mixer at a temperature of about 155° C. The material was then sheeted and granulated for extrusion. The extrusion onto wire was carried out using a No. 1 Royle 2″ barrel extruder fitted with a Hartig wire crosshead and a die having an included angle of 45°, a parallel land of 0.036 inch and a die opening of 0.036 inch. No. 24 AWG copper wire (0.020 inch diameter) was extrusion coated with each composition at a rate of 2400 feet per minute.

The compositions of the examples contained 0.1 percent by weight of 4,4′-thiobis(6-tert.-butyl meta-cresol) as a stabilizer. The stabilizer was added during fluxing in the Banbury. The properties of the components of the examples and the amounts used are given in Table II below. The properties of the coated wire samples are also reported in Table II. The controls are given in Table III.

TABLE I

| Property | High Density Polyethylene | | |
|---|---|---|---|
| | (A) | (B) | (C) |
| Density | 0.954 | 0.950 | 0.953 |
| Melt Index | 0.007 | 0.79 | 0.25 |
| Melt Flow | 1.1 | 67 | 30 |
| Intrinsic Viscosity [1] | 3.27 | 1.61 | 1.71 |

[1] Intrinsic Viscosity was determined according to the procedure of ASTM D-1601-61 and was calculated from reduced viscosity using the equation $$\frac{1}{IV} = \frac{1}{RV} + kC$$

wherein

IV = intrinsic viscosity
RV = reduced viscosity
k = 0.4
C = concentration in grams of polyethylene per 100 ml. of tetralin at 125° C.

Reduced viscosity was determined in tetralin at 125° C. using a standard Ubbelohde viscometer and the equation $$\text{Reduced Viscosity} = \frac{t_s - t_0}{C t_0}$$

wherein $t_0$ is the efflux time of the pure solvent
$t_s$ is the efflux time of the polyethylene solution
C = concentration in grams of polyethylene per 100 ml. of tetralin at 125° C.

TABLE II

| | Examples | | | | | | | | | |
|---|---|---|---|---|---|---|---|---|---|---|
| | 1 | 2 | 3 | 4 | 5 | 6 | 7 | 8 | 9 | 10 |
| High Density Polyethylene: | | | | | | | | | | |
| Density, grams per cc | b 0.95 | a 0.954 | b 0.95 | c 0.939 | a 0.954 | b 0.950 | b 0.95 | b 0.950 | a 0.954 | b 0.950 |
| Melt Index, decigrams per minute | 0.06 | 0.007 | 0.06 | 0.007 | 0.007 | <0.01 | 0.06 | <0.01 | 0.007 | <0.01 |
| Melt Flow, decigrams per minute | 5.8 | 1.1 | 5.8 | 1.1 | 1.1 | 1.8 | 5.8 | 1.8 | 1.1 | 1.8 |
| Percent by weight | 1 | 2 | 3 | 5 | 5 | 5 | 7 | 9 | 40 | 40 |
| Low Density Polyethylene: | | | | | | | | | | |
| Density, grams per cc | 0.92 | 0.92 | 0.92 | 0.92 | 0.92 | 0.92 | 0.92 | 0.92 | 0.92 | 0.92 |
| Melt Index, decigrams per minute | 0.2 | 0.2 | 0.2 | 0.2 | 0.2 | 0.2 | 0.2 | 0.2 | 0.2 | 0.2 |
| Melt Flow, decigrams per minute | 35 | 35 | 35 | 35 | 35 | 35 | 35 | 35 | 35 | 35 |
| Percent by weight | 98.9 | 97.9 | 96.9 | 94.9 | 94.9 | 94.9 | 92.9 | 90.9 | 59.9 | 59.9 |
| Properties: | | | | | | | | | | |
| Melt fracture rating | 2 | 2 | 1 | 1 | 1 | 1 | 1 | 1 | 1 | 1 |
| Density, grams per cc | | | | 0.922 | 0.923 | 0.923 | | 0.924 | 0.940 | |
| Tensile strength, p.s.i. | | | | 1,966 | 1,986 | 2,113 | | 2,696 | 2,795 | |
| Percent elongation | | | | 764 | 506 | 826 | | 700 | 74 | | a Phillips particle form polyethylene 03-2-0069.
b Particle form polyethylene.
c Contains 1% polymerized 1-butene—Phillips particle form polyethylene 03-2-0040.

TABLE III

| | Controls | | | | | | | | | |
|---|---|---|---|---|---|---|---|---|---|---|
| | 1 | 2 | 3 | 4 | 5 | 6 | 7 | 8 | 9 | 10 |
| Polyethylene: | | | | | | | | | | |
| Density, grams per cc | 0.95 | 0.953 | a 0.954 | b 0.939 | 0.95 | 0.953 | b 0.939 | a 0.954 | 0.919 | |
| Melt Index, decigrams per minute | 0.79 | 0.25 | 0.007 | 0.007 | 0.79 | 0.25 | 0.007 | 0.007 | 0.05 | |
| Melt Flow, decigrams per minute | 67 | 30 | 1.1 | 1.1 | 67 | 30 | 1.1 | 1.1 | 2.75 | |
| Percent by weight | 100 | 100 | 100 | 100 | 3 | 7 | 5 | 5 | 5 | |
| Polyethylene: | | | | | | | | | | |
| Density, grams per cc | 0.92 | | | | | 0.92 | 0.92 | 0.947 | 0.947 | 0.92 |
| Melt Index, decigrams per minute | 0.2 | | | | | 0.2 | 0.2 | 0.2 | 0.2 | 0.2 |
| Melt Flow, decigrams per minute | 35 | | | | | 35 | 35 | 45 | 45 | 35 |
| Percent by weight | 100 | | | | | 96.9 | 92.9 | 94.9 | 94.9 | 94.9 |
| Properties: | | | | | | | | | | |
| Melt fracture rating | 4 | 4 | 4 | (c) | (c) | 4 | 4 | 4 | 4 | 4 |
| Density, grams per cc | 0.92 | 0.95 | 0.953 | | | | | | | |
| Tensile strength, p.s.i. | | | | | | | | | | |
| Percent Elongation | | | | | | | | | | | a Phillips particle form polyethylene 03-2-0069.
b Contains 1% polymerized 1-butene—Phillips particle form polyethylene 03-2-0040.
c Not extrudable.

Tables II and III demonstrate that low density polyethylene (Control 1 and conventional high density, high melt flow polyethylenes (Controls 2 and 3) by themselves undergo extreme melt fracture under high speed extrusion conditions. High density, low melt flow polyethylenes (Controls 4 and 5) on the other hand, have such a high molecular weight as to be not extrudable onto wire. Table II demonstrates that high density, low melt flow particle form polyethylene, in amounts as small as 1 and 2 percent by weight (Examples 1 and 2) significantly reduces melt fracture, while amounts from 3 to 40 percent by weight (Examples 3–10) completely eliminate melt fracture under high speed extrusion conditions. In contrast, conventional high density, high melt flow polyethylenes (Controls 6 and 7) and low density, low melt flow polyethylenes (Control 10) have no effect on melt fracture under high speed extrusion conditions. Furthermore, high density, low melt flow polyethylenes have no effect on the melt fracture of high density, high melt flow polyethylenes (Controls 8 and 9).

I claim:

1. A composition comprising low density polyethylene having a density of from about 0.915 to about 0.925 and from about 1 to about 9 percent by weight, based on the weight of the composition of high density, high molecular weight polyethylene of narrow molecular weight distribution having a density of from about 0.930 to about 0.965, a melt index of not more than 0.1 decigrams per minute measured at 44 p.s.i. and 190° C., and a melt flow of not more than 10 decigrams per minute measured at 440 p.s.i. and 190° C., the melt index of said low density polyethylene being no greater than about 30 times the melt index of the high density polyethylene.

2. A composition comprising low density polyethylene having a density of from about 0.915 to about 0.925, and from about 3 to about 7 percent by weight, based on the weight of the composition of high density, high molecular weight polyethylene of narrow molecular weight distribution having a density of from about 0.935 to about 0.965, a melt index of not more than 0.05 decigram per minute measured at 44 p.s.i. and 190° C., and a melt flow of not more than 5 decigrams per minute measured at 440 p.s.i. and 190° C., the melt index of said low density polyethylene being no greater than about 30 times the melt index of the high density polyethylene.

3. An insulated electrical conductor comprising an electrical conductor and as insulation therefor a composition comprising low density polyethylene having a density of from about 0.915 to about 0.925 and from about 1 to about 9 percent by weight, based on the weight of the composition of high density, high molecular weight polyethylene of narrow weight distribution having a density of from about 0.930 to about 0.965, a melt index of not more than 0.1 decigram per minute measured at 44 p.s.i. and 190° C., and a melt flow of not more than 10 decigrams per minute measured at 440 p.s.i. and 190° C., the melt index of said low density polyethylene being no greater than about 30 times the melt index of the high density polyethylene.

4. An insulated electrical conductor comprising an electrical conductor and as insulation therefor a composition comprising low density polyethylene having a density of from about 0.915 to about 0.925, and from about 3 to about 7 percent by weight, based on the weight of the composition of high density, high molecular weight polyethylene of narrow molecular weight distribution having a density of from about 0.935 to about 0.965, a melt index of not more than 0.05 decigram per minute measured at 44 p.s.i. and 190° C., and a melt flow of one more than 5 decigrams per minute measured at 440 p.s.i and 190° C., the melt index of said low density polyethylene being no greater than about 30 times the melt index of the high density polyethylene.

References Cited

UNITED STATES PATENTS

| | | | |
|---|---|---|---|
| 2,868,762 | 1/1959 | Oakes | 260—897 |
| 2,983,704 | 5/1961 | Roedel | 260—897 |
| 2,993,876 | 7/1961 | McGlamery | 260—897 |

FOREIGN PATENTS

| | | |
|---|---|---|
| 790,115 | 2/1958 | Great Britain. |
| 641,321 | 5/1962 | Canada. |

GEORGE F. LESMES, *Primary Examiner.*

M. TILLMAN, *Examiner.*

T. G. FIELD, *Assistant Examiner.*